US012759417B2

(12) United States Patent
Suzuki

(10) Patent No.: US 12,759,417 B2
(45) Date of Patent: Oct. 13, 2026

(54) VEHICLE, CHARGING METHOD, AND COMPUTER APPARATUS

(71) Applicant: TOYOTA JIDOSHA KABUSHIKI KAISHA, Toyota (JP)

(72) Inventor: Yasuo Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 700 days.

(21) Appl. No.: 18/339,300

(22) Filed: Jun. 22, 2023

(65) Prior Publication Data

US 2024/0001783 A1 Jan. 4, 2024

(30) Foreign Application Priority Data

Jun. 30, 2022 (JP) ................................ 2022-105770

(51) Int. Cl.

| | |
|---|---|
| ***B60L 53/16*** | (2019.01) |
| ***B60L 53/30*** | (2019.01) |
| ***H02J 7/50*** | (2026.01) |
| ***H02J 7/94*** | (2026.01) |
| ***H02J 105/37*** | (2026.01) |

(52) U.S. Cl.
CPC ............. *B60L 53/16* (2019.02); *B60L 53/305* (2019.02); *H02J 7/50* (2026.01); *H02J 7/94* (2026.01); *H02J 2105/37* (2026.01)

(58) Field of Classification Search
CPC .................................................. B60L 2270/20
See application file for complete search history.

(56) References Cited

U.S. PATENT DOCUMENTS

| | | | | |
|---|---|---|---|---|
| 9,290,105 B2 * | 3/2016 | Zhao | B60L 3/0046 | |
| 10,587,205 B2 * | 3/2020 | Tazaki | H02M 1/32 | |
| 10,604,018 B2 * | 3/2020 | Spesser | B60L 58/12 | |
| 10,917,023 B2 * | 2/2021 | Chen | H02M 7/487 | |
| 11,652,423 B2 * | 5/2023 | Chizuwa | H02M 1/32 | 363/50 |
| 12,401,290 B2 * | 8/2025 | Ferrer Duran | B60L 53/22 | |
| 2011/0227534 A1 * | 9/2011 | Mitsutani | B60L 53/14 | 320/109 |
| 2013/0193920 A1 * | 8/2013 | Dickerhoof | B60L 53/00 | 320/109 |
| 2013/0249282 A1 * | 9/2013 | Ishii | B60L 53/65 | 307/10.1 |

(Continued)

FOREIGN PATENT DOCUMENTS

| | | |
|---|---|---|
| CN | 114148193 A | 3/2022 |
| JP | 2014017917 A | 1/2014 |

*Primary Examiner* — Tynese V Mcdaniel
(74) *Attorney, Agent, or Firm* — Dinsmore & Shohl LLP

(57) ABSTRACT

A method of charging a power storage mounted on a vehicle with electric power inputted to a charging port of the vehicle includes connecting a first charging path leading from the charging port via a first charger to the power storage and disconnecting a second charging path leading from the charging port via a second charger to the power storage, performing precharging of the first charger while the second charging path is disconnected and the first charging path is connected, determining whether or not the precharging of the first charger has been completed, and connecting both of the first charging path and the second charging path when it is determined that the precharging of the first charger has been completed.

7 Claims, 7 Drawing Sheets

(56) References Cited

U.S. PATENT DOCUMENTS

| | | | | |
|---|---|---|---|---|
| 2014/0021916 | A1* | 1/2014 | Bilezikjian | B60L 3/0092 320/109 |
| 2014/0132226 | A1* | 5/2014 | Sakamoto | B60L 3/0046 320/166 |
| 2014/0236379 | A1* | 8/2014 | Masuda | B60L 53/20 700/297 |
| 2015/0130414 | A1* | 5/2015 | Izumi | B60L 53/14 320/109 |
| 2016/0152156 | A1* | 6/2016 | Pritelli | B60L 58/10 320/136 |
| 2020/0039365 | A1* | 2/2020 | Chang | B60L 50/00 |
| 2020/0269710 | A1* | 8/2020 | Fong | H02J 7/663 |
| 2020/0406768 | A1* | 12/2020 | Pfeilschifter | B60L 3/00 |
| 2021/0008984 | A1* | 1/2021 | Pfeilschifter | B60L 53/22 |
| 2021/0155101 | A1* | 5/2021 | Pfeilschifter | B60L 53/14 |
| 2021/0170899 | A1* | 6/2021 | Wang | B60L 3/0023 |
| 2022/0072963 | A1* | 3/2022 | Minamii | B60L 53/20 |
| 2022/0216718 | A1* | 7/2022 | Wang | H02J 7/345 |
| 2022/0281335 | A1* | 9/2022 | Golriz | B60L 53/22 |
| 2022/0289057 | A1* | 9/2022 | Tsuchiya | B60L 53/20 |
| 2023/0024016 | A1* | 1/2023 | Yeo | B60L 53/80 |
| 2023/0336087 | A1* | 10/2023 | Kitazawa | B60L 58/00 |
| 2023/0356607 | A1* | 11/2023 | McAlwee | B60L 53/11 |
| 2023/0415599 | A1* | 12/2023 | Choi | B60L 53/66 |
| 2024/0001783 | A1* | 1/2024 | Suzuki | B60L 53/16 |
| 2024/0092197 | A1* | 3/2024 | Huang | B60L 53/11 |
| 2024/0192273 | A1* | 6/2024 | Motta | G01R 31/3278 |
| 2024/0230746 | A1* | 7/2024 | Zhang | G01R 31/62 |
| 2025/0035695 | A1* | 1/2025 | Liu | G01R 31/52 |

* cited by examiner

VEHICLE, CHARGING METHOD, AND COMPUTER APPARATUS

CROSS REFERENCE TO RELATED APPLICATIONS

This nonprovisional application is based on Japanese Patent Application No. 2022-105770 filed with the Japan Patent Office on Jun. 30, 2022, the entire contents of which are hereby incorporated by reference.

BACKGROUND

Field

The present disclosure relates to a vehicle, a charging method, and a computer apparatus.

Description of the Background Art

Japanese Patent Laying-Open No. 2014-017917 discloses a vehicle-mounted power supply apparatus including a charger that charges a vehicle-mounted battery and a control device that controls the charger. The control device performs precharging of the charger before start of charging. This precharging increases a voltage of a smoothing capacitor included in the charger. A rush current at the time of start of charging is thus suppressed.

SUMMARY

As a result of precharging as above, the rush current at the time of start of charging can be suppressed. When charging power supplied to a power storage (vehicle-mounted battery) from an inlet of a vehicle via the charger becomes higher, however, the rush current at the time of precharging becomes higher, and hence it becomes difficult to sufficiently suppress the rush current based on the technique described in Japanese Patent Laying-Open No. 2014-017917.

The present disclosure was made to solve the problem above, and an object thereof is to facilitate sufficient suppression of a rush current at the time of precharging even when charging power supplied from an inlet of a vehicle via a charger to a power storage is high.

According to a form according to a first point of view of the present disclosure, a vehicle shown below is provided.

(Clause 1) The vehicle includes a charging port to which electric power from the outside of the vehicle is inputted, a power storage, a charger, and a control device that controls the charger. The charger includes a first charger and a second charger. The first charger is configured to charge the power storage with electric power from the charging port while a first charging path is connected. The first charging path leads from the charging port via the first charger to the power storage. The second charger is configured to charge the power storage with electric power from the charging port while a second charging path is connected. The second charging path leads from the charging port via the second charger to the power storage. The second charging path is provided with a switching device that switches between connection and disconnection of the second charging path. The control device controls the switching device to disconnect the second charging path before charging of the power storage, to maintain the first and second charging paths in a state where the second charging path is disconnected and the first charging path is connected during precharging of the first charger, and to connect the second charging path after precharging of the first charger is completed.

The vehicle includes a plurality of chargers. For example, in a form in which the vehicle includes two chargers, that is, in a form in which the vehicle includes only the two chargers (the first charger and the second charger) above, the sum of electric power that flows through the first charging path (which is also referred to as "first charging power" below) and electric power that flows through the second charging path (which is also referred to as "second charging power" below) corresponds to charging power (which is also referred to as "total charging power" below) supplied from the inlet of the vehicle via the chargers to the power storage. After precharging of each charger is completed, the power storage is charged with total charging power. Each of first charging power and second charging power is lower than total charging power.

When precharging of both of the first charger and the second charger is simultaneously performed, the rush current corresponding to the total charging power is produced at the time of precharging, and hence the rush current at the time of precharging becomes high. In this connection, in the configuration above, the plurality of chargers are precharged one by one. Specifically, while the second charging path is disconnected and the first charging path is connected, the control device completes precharging of the first charger, and thereafter has the second charging path connected. According to such control, since the rush current corresponding to first charging power lower than the total charging power is produced at the time of precharging of the first charger, the rush current at the time of precharging can be suppressed. Thus, according to the configuration above, even when charging power supplied from the inlet of the vehicle via the charger to the power storage is high, sufficient suppression of the rush current at the time of precharging is facilitated.

The number of chargers included in the vehicle is not limited to two but at least three chargers may be included. The vehicle may include a third charger in addition to the first charger and the second charger.

The vehicle may be an electrically powered vehicle (xEV) that uses electric power as the entirety or a part of a motive power source. Examples of the xEV include a battery electric vehicle (BEV), a plug-in hybrid electric vehicle (PHEV), and a fuel cell electric vehicle (FCEV).

The vehicle described in Clause 1 may include features described in any one of Clauses 2 to 6 shown below.

(Clause 2) The vehicle described in Clause 1 further includes features below. The first charger includes a capacitor where electricity is stored by precharging. The control device determines that precharging of the first charger has been completed when a current that flows through the first charger becomes lower than a first reference value and a voltage of the capacitor becomes higher than a second reference value during precharging of the first charger.

According to the configuration above, electricity is stored in the capacitor of the first charger as a result of charging and the voltage of the capacitor increases. With increase in voltage of the capacitor, the rush current that flows into the first charger becomes lower. Therefore, the control device can appropriately determine whether or not precharging of the first charger has been completed based on the current that flows through the first charger and the voltage of the capacitor.

(Clause 3) The vehicle described in Clause 1 or 2 further includes features below. When a prescribed condition is satisfied, the control device controls the switching device to connect the second charging path upon completion of precharging of the first charger. When the prescribed condition is not satisfied, the control device controls the switching device to disconnect the second charging path in spite of completion of precharging of the first charger. The prescribed condition includes a condition that rated output power of a power feed facility outside the vehicle exceeds a prescribed value. The power feed facility is connected to the charging port.

When rated output power of the power feed facility outside the vehicle connected to the charging port (and electric power inputted to the inlet of the vehicle from the power feed facility) is sufficiently low, an overcurrent may be unlikely in spite of charging of the power storage only with the first charger. In the configuration, when the prescribed condition including rated output power of the power feed facility exceeding the prescribed value is satisfied, the second charging path is connected after completion of precharging of the first charger, whereas when the prescribed condition is not satisfied, the second charging path is not connected. Charging can be started early by not connecting the second charging path when it is not necessary to use the second charger.

(Clause 4) The vehicle according to any one of Clauses 1 to 3 further includes features below. The vehicle further includes a power feed port for output of electric power to the outside of the vehicle. The second charger is configured to feed electric power to the power feed port with electric power from the power storage while a power feed path is connected. The power feed path leads from the power storage via the second charger to the power feed port. The switching device includes a C contact relay that connects any one of the second charging path and the power feed path and disconnects the other of the second charging path and the power feed path.

According to the configuration, switching between connection and disconnection of the second charging path can be made by means of the C contact relay that switches between charging and power feed. Therefore, a circuit configuration tends to be simplified.

(Clause 5) The vehicle described in any one of Clauses 1 to 3 further includes features below. The vehicle further includes a power feed port for output of electric power to the outside of the vehicle. The first charger is configured to feed electric power to the power feed port with electric power from the power storage while a first power feed path is connected. The first power feed path leads from the power storage via the first charger to the power feed port. The first charging path is provided with a first C contact relay that connects any one of the first charging path and the first power feed path and disconnects the other of the first charging path and the first power feed path. The second charger is configured to feed electric power to the power feed port with electric power from the power storage while a second power feed path is connected, the second power feed path leading from the power storage via the second charger to the power feed port. The switching device includes a second C contact relay that connects any one of the second charging path and the second power feed path and disconnects the other of the second charging path and the second power feed path.

According to the configuration, only any one of the first charger and the second charger can perform both of charging and power feed. Therefore, even when any one of the first charger and the second charger is in an abnormal condition, the other charger can perform charging and power feed. At the time of purchase of the vehicle, the first charger can also be provided as standard equipment and the second charger can also be optional.

(Clause 6) The vehicle described in any one of Clauses 1 to 5 further includes features below. When a prescribed condition is satisfied, the control device controls the switching device to connect the second charging path upon completion of precharging of the first charger. When the prescribed condition is not satisfied, the control device controls the switching device to disconnect the second charging path in spite of completion of precharging of the first charger. The prescribed condition includes a condition that the second charger is available.

According to the configuration, when the prescribed condition including the condition that the second charger is available is satisfied, the second charging path is connected after completion of precharging of the first charger, whereas when the prescribed condition is not satisfied, the second charging path is not connected. Charging can be started early by not connecting the second charging path when the second charger is unavailable. Unavailability of the second charger may include at least one of an abnormal condition of the second charger and the vehicle not being provided with the second charger.

According to a form according to a second point of view of the present disclosure, a charging method shown below is provided.

(Clause 7) The charging method is a method of charging a power storage mounted on a vehicle with electric power inputted to a charging port of the vehicle, and the charging method includes connecting a first charging path leading from the charging port via a first charger to the power storage, disconnecting a second charging path leading from the charging port via a second charger to the power storage, performing precharging of the first charger while the second charging path is disconnected and the first charging path is connected, determining whether precharging of the first charger has been completed, and connecting both of the first charging path and the second charging path when it is determined that precharging of the first charger has been completed.

According to the charging method as well, even when charging power supplied from the inlet of the vehicle via the chargers to the power storage is high as in the vehicle described previously, sufficient suppression of the rush current at the time of precharging is facilitated.

According to a form according to another point of view, a program that causes a computer to perform the charging method described in Clause 7 is provided. In one form, a computer apparatus including a processor and a storage where a program that causes the processor to perform the charging method described in Clause 7 is stored is provided. In another form, a computer apparatus that distributes the program is provided.

The foregoing and other objects, features, aspects and advantages of the present disclosure will become more apparent from the following detailed description of the present disclosure when taken in conjunction with the accompanying drawings.

DETAILED DESCRIPTION

Figure 1:
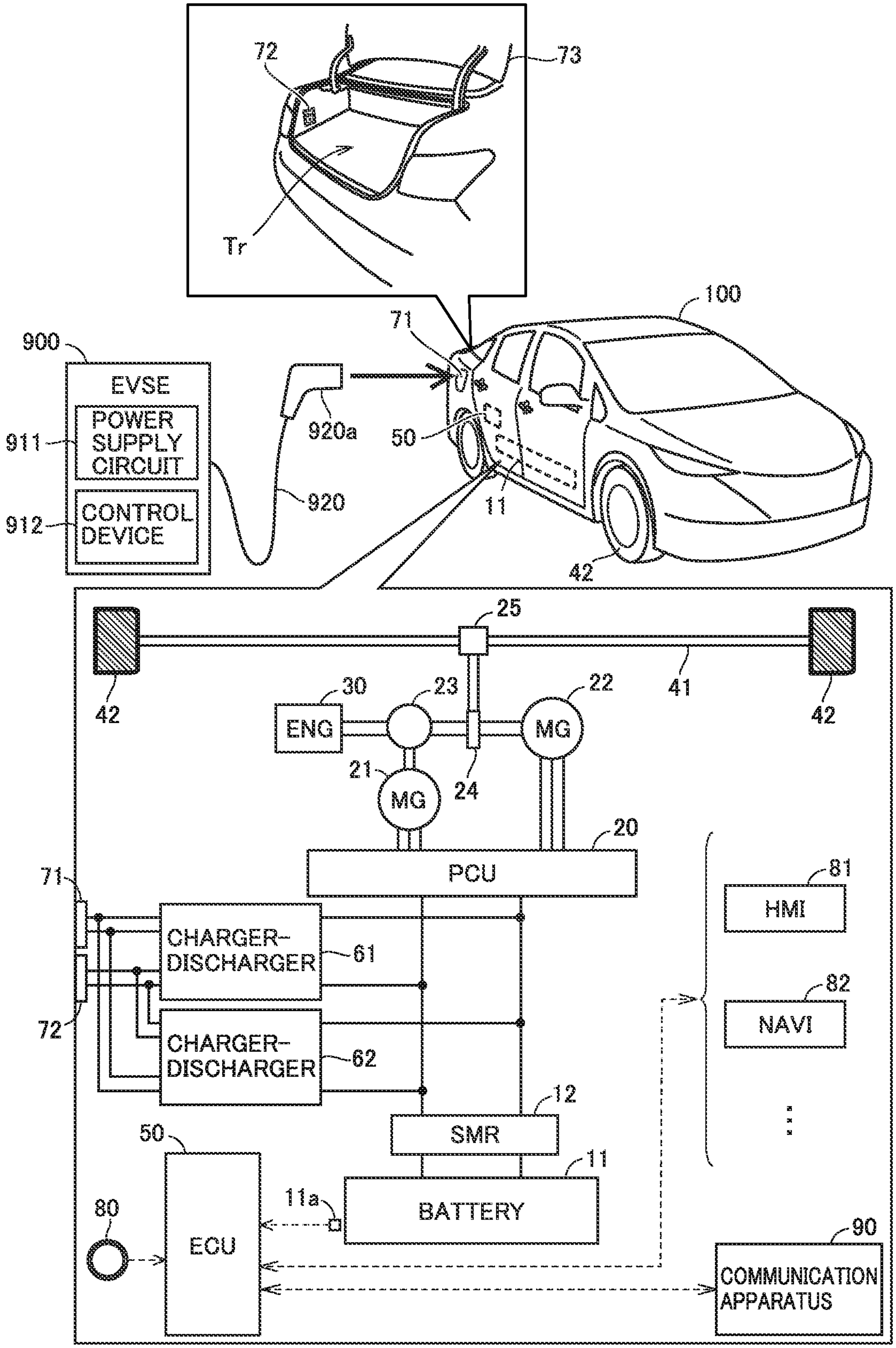
FIG. 1 is a diagram showing a configuration of a vehicle according to an embodiment of the present disclosure.

An embodiment of the present disclosure will be described in detail with reference to the drawings. The same or corresponding elements in the drawings have the same reference characters allotted and description thereof will not be repeated.

FIG. 1 is a diagram showing a configuration of a vehicle according to this embodiment. Referring to FIG. 1, a vehicle 100 according to this embodiment includes a battery 11 chargeable by electric vehicle supply equipment (EVSE) 900. Vehicle 100 is configured to travel with electric power stored in battery 11. Vehicle 100 according to this embodiment is a plug-in hybrid vehicle (PHEV). Without being limited as such, vehicle 100 may be an electrically powered vehicle (xEV) other than the PHEV. A known vehicle power storage (for example, a flooded secondary battery, an all-solid secondary battery, or a battery assembly) can be adopted as battery 11. Examples of the vehicle secondary battery include a lithium ion battery and a nickel metal hydride battery. Battery 11 corresponds to an exemplary "power storage" according to the present disclosure.

Vehicle 100 further includes an inlet 71 to and from which a connector 920*a* of EVSE 900 is attachable and removable. Inlet 71 corresponds to an exemplary "charging port" according to the present disclosure. Electric power from the outside of the vehicle is inputted to inlet 71. As connector 920*a* (a plug) of a charging cable 920 connected to a main body of EVSE 900 is connected to inlet 71 of parked vehicle 100, vehicle 100 is set to a state in which it is electrically connected to EVSE 900 (which is also referred to as a "plugged-in state" below). For example, while vehicle 100 is traveling, vehicle 100 is in a state in which it is not electrically connected to EVSE 900 (which is also referred to as a "plug-out state" below). Though FIG. 1 shows only inlet 71 adapted to a power feed type of EVSE 900, vehicle 100 may include a plurality of inlets so as to adapt to a plurality of types of power feed (for example, an alternating-current (AC) type and a direct-current (DC) type).

EVSE 900 is configured to feed power by receiving supply of electric power from an external power supply (for example, a not-shown power grid). The main body of EVSE 900 contains a power supply circuit 911 and a control device 912 that controls power supply circuit 911. Power supply circuit 911 is electrically connected to the external power supply. Power supply circuit 911 converts electric power supplied from the external power supply into electric power suitable for power feed to vehicle 100 and outputs resultant electric power to charging cable 920. EVSE 900 outputs electric power for supply to vehicle 100 from connector 920*a* (a tip end of charging cable 920).

Vehicle 100 further includes an outlet 72. Outlet 72 corresponds to an exemplary "power feed port" according to the present disclosure. Outlet 72 outputs electric power to the outside of the vehicle. Outlet 72 may be a receptacle that outputs AC power at a prescribed voltage (for example, 100 V or 200 V). Outlet 72 may be arranged in a trunk room Tr of vehicle 100. Outlet 72 is provided, for example, on a wall surface or a floor surface of trunk room Tr. A trunk lid 73 is constructed to be opened and closed by a user. A position of outlet 72 can be changed as appropriate, and outlet 72 may be arranged, for example, in a vehicle compartment.

Vehicle 100 further includes a battery management system (BMS) 11*a*, a system main relay (SMR) 12, a power control unit (PCU) 20, motor generators (MGs) 21 and 22, a planetary gear 23, a driven gear 24, a differential gear 25, an engine 30, a driveshaft 41, a drive wheel 42, an electronic control unit (which is denoted as an "ECU" below) 50, charger-dischargers 61 and 62, a start switch 80, a human machine interface (HMI) 81, a navigation system (which is also referred to as a "NAVI" below) 82, and a communication apparatus 90.

ECU 50 is a computer including, for example, a processor, a random access memory (RAM), and a storage. The storage is configured such that information that is put thereinto can be stored therein. Not only a program but also information (for example, a map, a mathematical expression, and various parameters) to be used by a program is stored in the storage. As a program stored in the storage is executed by the processor, various types of control (for example, control shown in FIG. 4 which will be described later) by ECU 50 are carried out in this embodiment. ECU 50 corresponds to an exemplary "control device" according to the present disclosure.

ECU 50 communicates with an apparatus outside vehicle 100 through communication apparatus 90. Communication apparatus 90 includes a communication interface (I/F) for communication by ECU 50 with control device 912 of EVSE 900.

Planetary gear 23 functions as a motive power split mechanism. Planetary gear 23, is, for example, a single pinion type planetary gear, and includes a pinion gear, a carrier (input element), a sun gear (repulsive element), and a ring gear (output element). An output shaft of engine 30 and a rotor shaft of MG 21 are coupled to the carrier and the sun gear of planetary gear 23, respectively. Planetary gear 23 outputs torque from engine 30 as being split into torque to the sun gear and torque to the ring gear.

MG 22, planetary gear 23, driven gear 24, and differential gear 25 are constructed to transmit to drive wheel 42, motive power outputted to the ring gear and motive power outputted to the rotor shaft of MG 22 as being combined. More specifically, driven gear 24 functions to combine motive power from planetary gear 23 (ring gear) and motive power from MG 22. Drive torque thus combined is transmitted to differential gear 25 and further to drive wheels 42 through driveshaft 41 that laterally extends from differential gear 25.

Any internal combustion engine can be adopted as engine 30. In this embodiment, a spark ignition type internal combustion engine including a plurality of cylinders is adopted as engine 30. Engine 30 generates motive power by burning fuel (for example, gasoline) in each cylinder and rotates a crankshaft (not shown) common to all cylinders with generated motive power. Engine 30 is not limited to a gasoline engine, and a diesel engine or a hydrogen engine may be applicable.

In this embodiment, an AC motor (for example, a permanent magnet synchronous motor or an induction motor) is employed as each of MGs 21 and 22. MGs 21 and 22 function as motors for travel of vehicle 100. MGs 21 and 22 are driven by PCU 20 and rotate drive wheels 42 of vehicle 100. MGs 21 and 22 generate electric power depending on a condition, and output generated electric power to battery 11. MG 21 can generate electric power with motive power from engine 30.

PCU 20 drives MGs 21 and 22 with electric power supplied from battery 11. PCU 20 is configured to control states of MG 21 and MG 22 separately, and for example, it can set MG 21 to a power generation state while it can set MG 22 to a power running state. PCU 20 includes, for example, an inverter and a DC/DC converter. SMR 12 switches between connection and disconnection of an electrical path from battery 11 to PCU 20. Each of SMR 12 and PCU 20 is controlled by ECU SMR 12 is set to a closed state (a connected state) while vehicle 100 travels. SMR 12 is set to the closed state also when electric power is exchanged between battery 11 and the outside of the vehicle (inlet 71 or outlet 72).

BMS 11*a* monitors a state of battery 11. Specifically, BMS 11*a* includes various sensors that detect states (for example, a voltage, a current, and a temperature) of battery 11, and outputs a result of detection to ECU 50. ECU 50 can obtain the state (for example, a temperature, a current, a voltage, and an SOC) of battery 11 based on the output from BMS 11*a*. The state of charge (SOC) represents a remaining amount of stored power, and it is expressed, for example, as a ratio of a current amount of stored power to an amount of stored power in a fully charged state that ranges from 0 to 100%.

Charger-discharger 61 and charger-discharger 62 are connected in parallel to each other. Charger-discharger 61 is located between inlet 71 and battery 11 and between outlet 72 and battery 11. Charger-discharger 62 is located between inlet 71 and battery 11 and between outlet 72 and battery 11. In this embodiment, charger-discharger 61 and charger-discharger 62 correspond to an exemplary "first charger" and an exemplary "second charger" according to the present disclosure, respectively.

Each of charger-dischargers 61 and 62 is controlled by ECU 50 and functions as both of a charger (charging circuit) and a discharger (discharging circuit). Each of charger-dischargers 61 and 62 charges battery 11 with electric power inputted to inlet 71 from the outside of the vehicle. Each of charger-dischargers 61 and 62 discharges electric power in battery 11 to the outside of the vehicle through outlet 72. Though details of a circuit configuration will be described later, each of charger-dischargers 61 and 62 bidirectionally performs AC/DC conversion.

Vehicle 100 in the plugged-in state can perform external charging (that is, charging of battery 11 with electric power from the outside of the vehicle) and external power feed (that is, power feed to the outside of the vehicle with electric power in battery 11). Electric power for external charging is supplied, for example, from EVSE 900 to inlet 71. Each of charger-dischargers 61 and 62 converts electric power (for example, AC power) received at inlet 71 into electric power (for example, DC power) suitable for charging of battery 11 and outputs resultant electric power to battery 11. Electric power for external power feed is supplied from battery 11 to each of charger-dischargers 61 and 62. Each of charger-dischargers 61 and 62 converts DC power supplied from battery 11 into electric power (for example, AC power) suitable for external power feed and outputs resultant electric power to outlet 72.

Switching between on (activation) and off (deactivation) of a vehicle system (a system that controls vehicle 10) including ECU 50 is made by an operation onto start switch 80 by the user. Start switch 80 is provided, for example, in the vehicle compartment of vehicle 100. In general, the start switch of the vehicle is referred to as a "power switch" or an "ignition switch."

HMI 81 includes an input apparatus and a display apparatus. HMI 81 may include a touch panel display. HMI 81 may include a meter panel and/or a head-up display. NAVI 82 detects a position of vehicle 100, for example, with the use of the global positioning system (GPS), and shows the position of vehicle 100 on a map in real time. NAVI 82 searches for a route by referring to map information.

Figure 2:
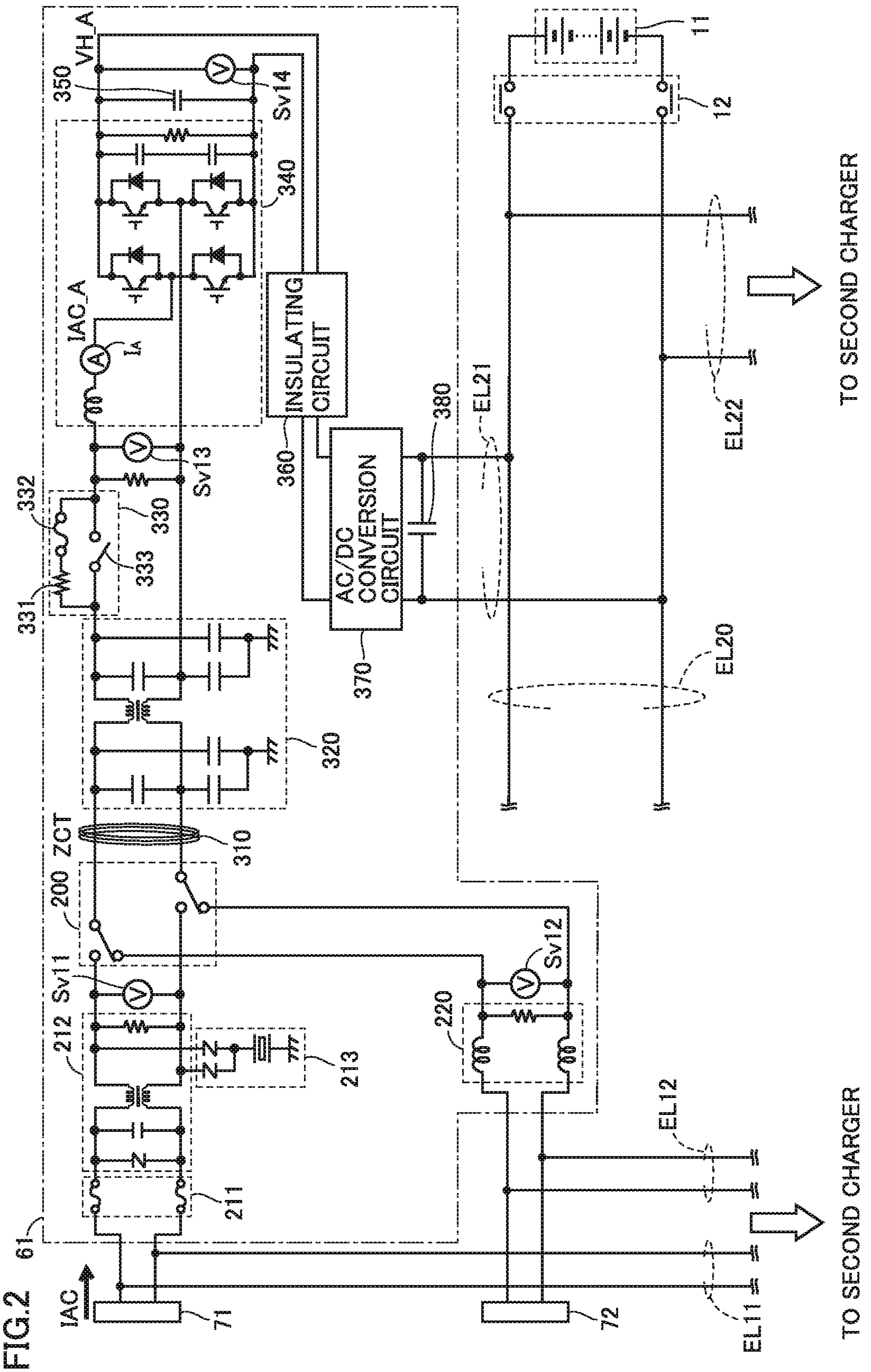
FIG. 2 is a diagram showing a circuit configuration of a first charger-discharger included in the vehicle shown in FIG. 1.

FIG. 2 is a diagram showing a circuit configuration of charger-discharger 61. Referring to FIG. 2, charger-discharger 61 includes a circuit including a switching device 200. This circuit is branched at a position where switching device 200 is arranged, and with this branch point (switching device 200) being defined as a reference, this circuit can broadly be divided into a circuit on an inlet 71 side (which is referred to as an "input circuit" below), a circuit on an outlet 72 side (which is referred to as an "output circuit" below), and a circuit on a battery 11 side (which is referred to as a "battery circuit" below). Switching device 200 includes a pair of C contact relays controlled by ECU 50. The C contact relays are configured to connect any one of the input circuit and the output circuit to the battery circuit and to disconnect the other from the battery circuit.

The input circuit of charger-discharger 61 includes a fuse circuit 211, an AC input filter 212, and a surge protective device (SPD) 213. SPD 213 is connected to AC input filter 212 and functions as a lightning surge absorber circuit in an AC power supply. SPD 213 includes, for example, a varistor and an arrester. A voltage applied from the input circuit to the battery circuit is detected by a voltage sensor Sv11 and a result of detection is outputted to ECU 50.

The output circuit of charger-discharger 61 includes an AC output filter 220. A voltage applied from the battery circuit to the output circuit (AC output filter 220) is detected by a voltage sensor Sv12 and a result of detection is outputted to ECU 50.

The battery circuit of charger-discharger 61 includes a zero-phase current transformer (ZCT) 310, a filter 320, a precharging circuit 330, a power factor correction (PFC) circuit 340, a smoothing capacitor 350, an insulating circuit 360, an AC/DC conversion circuit 370, and a smoothing capacitor 380 in this order from switching device 200 toward battery 11.

ZCT 310 detects a ground fault current for each of electric power inputted from the input circuit to filter 320 and electric power outputted from filter 320 to the output circuit and outputs a result of detection to ECU 50.

Precharging circuit 330 includes a limiting resistor 331, a fuse 332 connected in series to limiting resistor 331, and a switch 333 connected in parallel to limiting resistor 331. Switch 333 is arranged in an electrical path that bypasses limiting resistor 331. In a state (which is also referred to as a "limiting resistor ON state" below) in which switch 333 is in an open state (a disconnected state), an electrical resistance of precharging circuit 330 becomes high owing to limiting resistor 331. In a state (which is also referred to as a "limiting resistor OFF state" below) in which switch 333 is in a closed state (a connected state), the electrical resistance of precharging circuit 330 is lower than a value in the limiting resistor ON state.

PFC circuit 340 includes an inverter that bidirectionally converts electric power. PFC circuit 340 is configured to bidirectionally convert a power waveform. A current and a voltage on a switching device 200 side of PFC circuit 340 are detected by a current sensor $I_A$ and a voltage sensor Sv13, respectively, and a result of detection is outputted to ECU 50. A voltage on the battery 11 side of PFC circuit 340 is detected by a voltage sensor Sv14 and a result of detection is outputted to ECU 50. ECU 50 controls PFC circuit 340 to obtain a target power waveform while it checks the voltage and the current with voltage sensors Sv11 to Sv14 and current sensor $I_A$.

Smoothing capacitor 350 is arranged between PFC circuit 340 and insulating circuit 360. A detection value from voltage sensor Sv14 corresponds to a voltage across terminals of smoothing capacitor 350. At the time of start of external charging of battery 11, electricity is stored in smoothing capacitor 350, as a result of electric power inputted from PFC circuit 340 to insulating circuit 360. For example, an insulating transformer is adopted as insulating circuit 360. The insulating transformer transforms a voltage at a ratio in accordance with a turns ratio between a primary coil and a secondary coil.

AC/DC conversion circuit 370 performs bidirectional AC/DC conversion. AC/DC conversion circuit 370 outputs AC power toward switching device 200 and outputs DC power toward battery 11. Smoothing capacitor 380 is arranged between AC/DC conversion circuit 370 and SMR 12.

Charger-discharger 61 configured as described above is electrically connected to an electric wire EL20 that connects PCU 20 (FIG. 1) and SMR 12 to each other through an electric wire EL21. During external charging of battery 11, SMR 12 is set to the closed state, and DC power outputted from AC/DC conversion circuit 370 is inputted to battery 11 through smoothing capacitor 380 and SMR 12.

Inlet 71 and outlet 72 are electrically connected to charger-discharger 62 through electric wires EL11 and EL12, respectively. Charger-discharger 62 is electrically connected to electric wire EL20 through an electric wire EL22.

Figure 3:
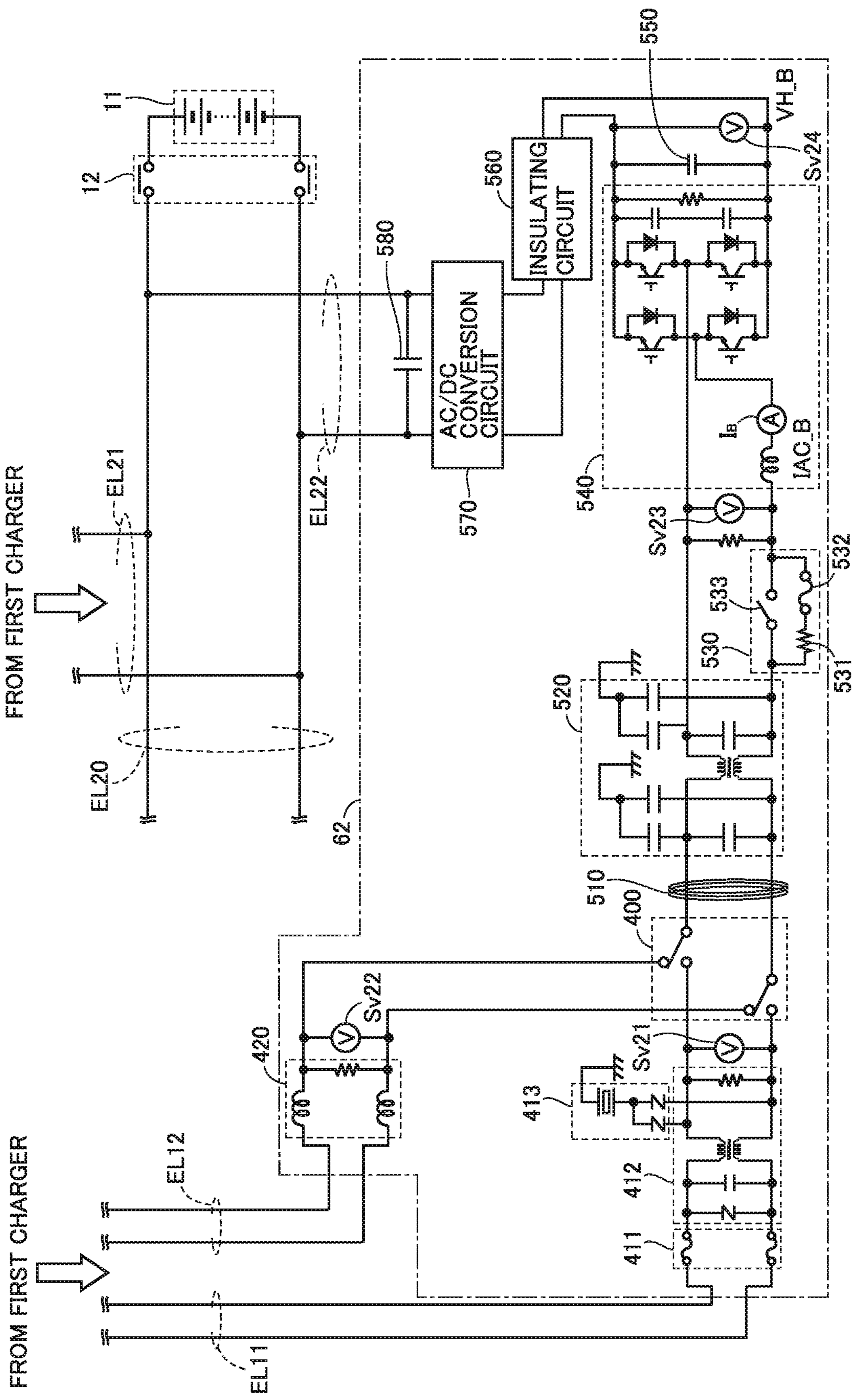
FIG. 3 is a diagram showing a circuit configuration of a second charger-discharger included in the vehicle shown in FIG. 1.

FIG. 3 is a diagram showing a circuit configuration of charger-discharger 62. Referring to FIG. 3, charger-discharger 62 is configured similarly to charger-discharger 61 described previously. A switching device 400, a fuse circuit 411, an AC input filter 412, an SPD 413, an AC output filter 420, a ZCT 510, a filter 520, a precharging circuit 530 (a limiting resistor 531, a fuse 532, and a switch 533), a PFC circuit 540, a smoothing capacitor 550, an insulating circuit 560, an AC/DC conversion circuit 570, a smoothing capacitor 580, voltage sensors Sv21 to Sv24, and a current sensor $I_B$ in charger-discharger 62 correspond to switching device 200, fuse circuit 211, AC input filter 212, SPD 213, AC output filter 220, ZCT 310, filter 320, precharging circuit 330 (limiting resistor 331, fuse 332, and switch 333), PFC circuit 340, smoothing capacitor 350, insulating circuit 360, AC/DC conversion circuit 370, smoothing capacitor 380, voltage sensors Sv11 to Sv14, and current sensor $I_A$ in charger-discharger 61, respectively.

Figure 4:
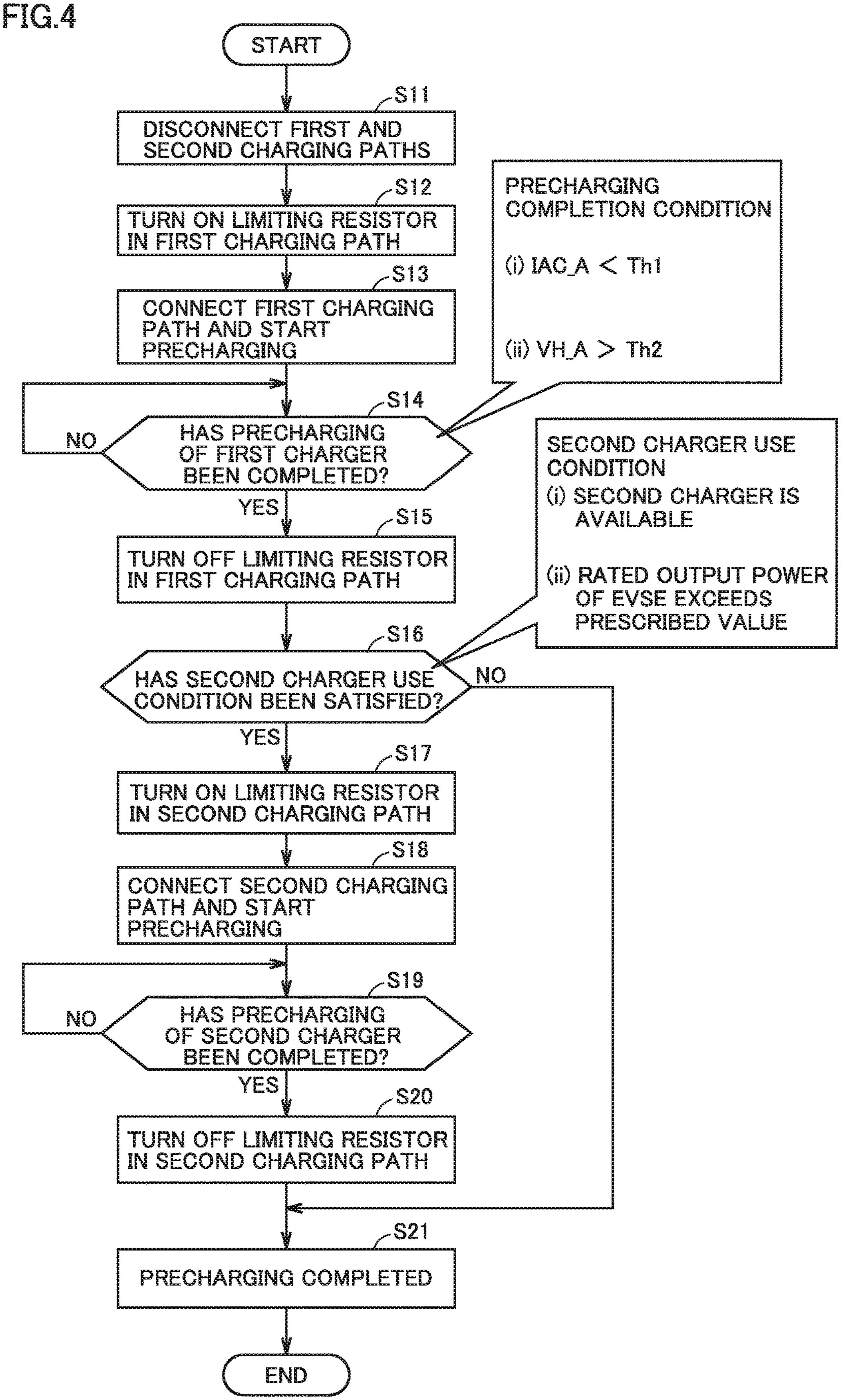
FIG. 4 is a flowchart showing a charging method according to the embodiment of the present disclosure.

FIG. 4 is a flowchart showing precharging control by ECU 50 according to this embodiment. ECU 50 corresponds to an exemplary "computer apparatus" according to the present disclosure. "S" in the flowchart means a step. Processing shown in this flowchart is started when a prescribed charging start condition including a condition that vehicle 100 is in the plugged-in state is satisfied. The charging start condition may be satisfied when vehicle 100 is set to the plugged-in state from the plug-out state or when time to start timer-programmed charging (time set in ECU 50) comes in vehicle 100 in the plugged-in state. Alternatively, the charging start condition may be satisfied when ECU 50 of vehicle 100 in the plugged-in state receives a charging instruction from HMI 81 or EVSE 900. In this embodiment, each of smoothing capacitors 350 and 550 is discharged during a period during which electric power is not exchanged between battery 11 and the outside of the vehicle (inlet 71 or outlet 72). Therefore, at the timing of start of a series of processing shown in FIG. 4, each of smoothing capacitors 350 and 550 is in an empty state (a state in which electric power is not stored).

Referring to FIG. 4 together with FIGS. 1 to 3, in S11, ECU 50 has each of a first charging path (a first charging path CL1 shown in FIGS. 5 and 6 which will be described later) and a second charging path (a second charging path CL2 shown in FIG. 6 which will be described later) disconnected. The first charging path is an electrical path leading from inlet 71 (charging port) via charger-discharger 61 (first charger) to battery 11 (power storage). In the first charging path according to this embodiment, switching device 200 that switches between connection and disconnection of the first charging path is provided (see FIG. 2). The second charging path is an electrical path leading from inlet 71 (charging port) via charger-discharger 62 (second charger) to battery 11 (power storage). In the second charging path according to this embodiment, switching device 400 that switches between connection and disconnection of the second charging path is provided (see FIG. 3).

Specifically, ECU 50 controls switching device 200 (the pair of C contact relays) to connect the output circuit (including AC output filter 220) to the battery circuit (including PFC circuit 340) and to disconnect the input circuit (including AC input filter 212) from the battery circuit in charger-discharger 61. ECU 50 controls switching device 400 (the pair of C contact relays) to connect the output circuit (including AC output filter 420) to the battery circuit (including PFC circuit 540) and to disconnect the input circuit (including AC input filter 412) from the battery circuit in charger-discharger 62. Thus, the first charging path is disconnected at the point (switching device 200) of branch to the input circuit and the output circuit in charger-discharger 61 and the second charging path is disconnected at the point (switching device 400) of branch to the input circuit and the output circuit in charger-discharger 62. Thus, ECU 50 controls switching device 200 to disconnect the first charging path and controls switching device 400 to disconnect the second charging path before charging of battery 11.

In following S12, ECU 50 sets charger-discharger 61 to the limiting resistor ON state. Specifically, ECU 50 sets switch 333 (FIG. 2) to the open state. The electrical resistance of the first charging path is thus increased by limiting resistor 331.

In following S13, ECU 50 has the first charging path connected. Specifically, ECU 50 controls switching device 200 (the pair of C contact relays) to connect the input circuit to the battery circuit and to disconnect the output circuit from the battery circuit in charger-discharger 61. Vehicle 100 is thus in a state that the second charging path is disconnected and the first charging path is connected.

Figure 5:
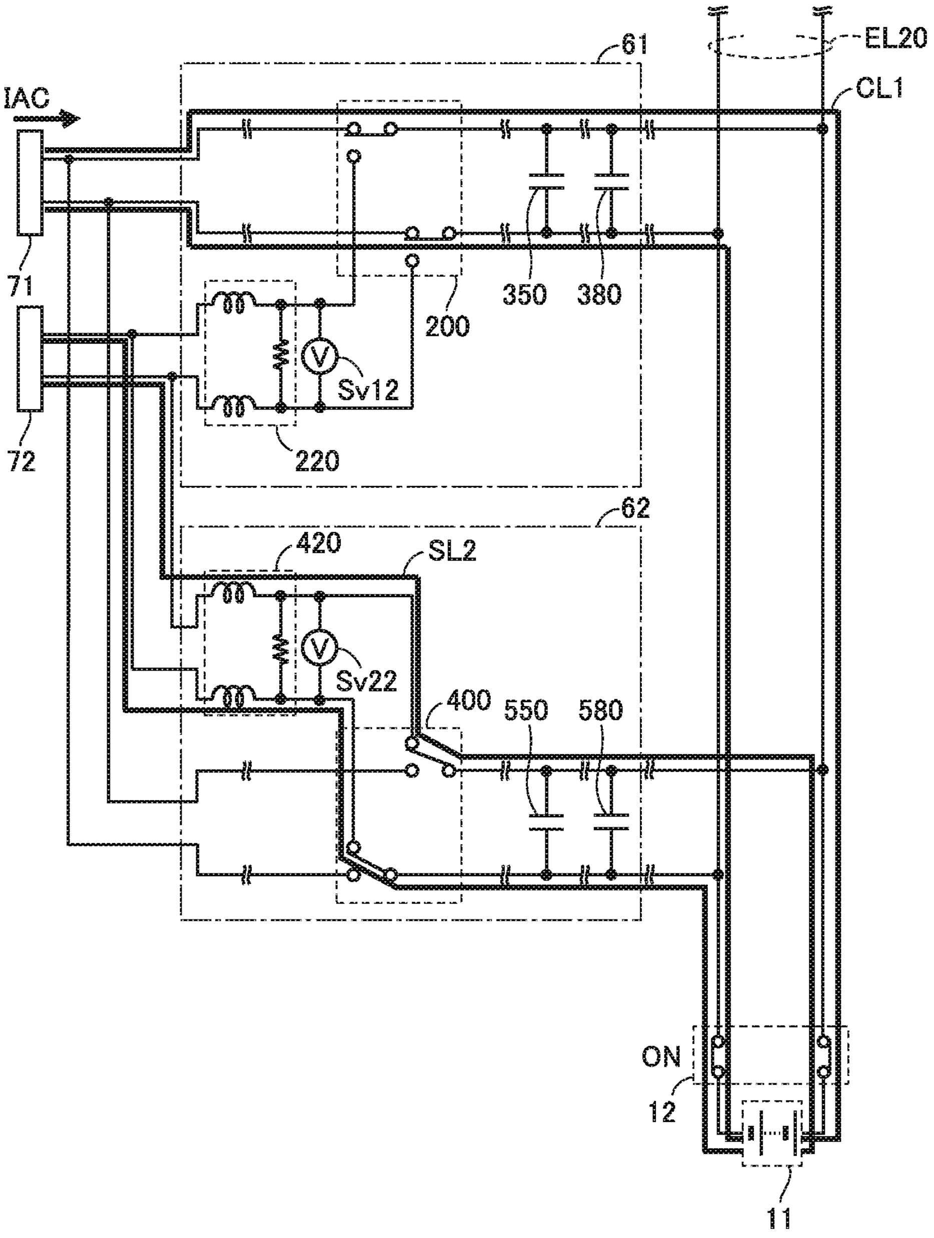
FIG. 5 is a diagram showing a state in which a second charging path is disconnected and a first charging path is connected in the vehicle shown in FIG. 1.

FIG. 5 is a diagram showing a state in which the second charging path is disconnected and the first charging path is connected in vehicle 100. Referring to FIG. 5, switching device 200 (more specifically, the C contact relays) is configured to connect any one of the first charging path and a first power feed path and to disconnect the other thereof in charger-discharger 61. The first power feed path is an electrical path leading from battery 11 (power storage) via charger-discharger 61 (first charger) to outlet 72 (power feed port).

Switching device 400 (more specifically, the C contact relays) is configured to connect any one of the second charging path and a second power feed path and to disconnect the other thereof in charger-discharger 62. The second power feed path is an electrical path leading from battery 11 (power storage) via charger-discharger 62 (second charger) to outlet 72 (power feed port).

In the state shown in FIG. 5, switching device 200 connects first charging path CL1. Switching device 400 connects a second power feed path SL2. Thus, each of the second charging path and the first power feed path is disconnected and each of first charging path CL1 and second power feed path SL2 is connected.

Referring again to FIG. 4 together with FIGS. 1 to 3, in S13, ECU 50 has first charging path CL1 (FIG. 5) connected and thereafter starts precharging of charger-discharger 61 (first charger). Specifically, ECU 50 requests EVSE 900 (control device 912) to feed electric power (for example, fed power from 2.5 kW to 5 kW) corresponding to charger-discharger 61. In succession, in S14, while ECU 50 performs precharging of charger-discharger 61 with first charging path CL1 being connected, ECU 50 determines whether or not precharging has been completed. Specifically, electricity is stored in smoothing capacitor 350 by precharging of charger-discharger 61. ECU 50 determines whether or not precharging of charger-discharger 61 has been completed based on whether or not a prescribed first precharging completion condition is satisfied. In this embodiment, the first precharging completion condition is satisfied when both of a first current requirement and a first voltage requirement are satisfied during precharging of charger-discharger 61. The first current requirement is satisfied when a current value IAC_A (a current that flows through charger-discharger 61) detected by current sensor $I_A$ is smaller than a prescribed first reference value (Th1). The first voltage requirement is satisfied when a voltage value VH_A (a voltage of smoothing capacitor 350) detected by voltage sensor Sv14 is larger than a prescribed second reference value (Th2). When one requirement of them is not satisfied, the first precharging completion condition is not satisfied. According to such a first precharging completion condition, whether or not precharging has been completed is more readily properly determined.

Any first precharging completion condition can be set without being limited as above. For example, the first precharging completion condition may be satisfied when a prescribed time period or longer has elapsed since start of precharging.

While the first precharging completion condition is not satisfied (NO in S14), ECU 50 allows precharging of charger-discharger 61 to continue, and when the first precharging completion condition is satisfied (YES in S14), the process proceeds to S15. In S15, ECU 50 sets charger-discharger 61 to the limiting resistor OFF state. Specifically, ECU 50 sets switch 333 (FIG. 2) to the closed state. The electrical resistance of first charging path CL1 thus becomes low and sufficient electric power tends to be supplied to battery 11.

In following S16, ECU 50 determines whether or not a prescribed second charger use condition is satisfied. In this embodiment, the second charger use condition is satisfied when both of charger-discharger 62 (second charger) being available (a first use requirement) and rated output power of EVSE 900 exceeding a prescribed value (a second use requirement) are satisfied. When one requirement of them is not satisfied, the second charger use condition is not satisfied.

When charger-discharger 62 is available in vehicle 100, ECU 50 determines that the first use requirement is satisfied. When charger-discharger 62 is in an abnormal condition, ECU 50 determines that the first use requirement is not satisfied. Even though vehicle 100 is not provided with charger-discharger 62, it can perform external charging and external power feed so long as it is provided with charger-discharger 61. In such a type of vehicle, charger-discharger 61 may be standard equipment and charger-discharger 62 may be optional equipment. The user can choose whether or not to incorporate optional equipment in the vehicle at the time of purchase of the vehicle. The vehicle not provided with charger-discharger 62 (optional equipment) does not satisfy the first use requirement.

In this embodiment, ECU 50 receives information (including rated output power) on specifications of EVSE 900 from control device 912. Rated output power indicates power feed performance of the power feed facility. EVSE 900 (the power feed facility outside the vehicle connected to inlet 71) may be a public power feed facility. Public power feed facilities include power feed facilities various in rated output power. When the power feed facility of rated output power exceeding a prescribed value is connected to inlet 71, ECU 50 determines that the second use requirement is satisfied. The prescribed value may be a value in accordance with charging performance of charger-discharger 61.

Any second charger use condition can be set without being limited as above. For example, one of the first use requirement and the second use requirement does not have to be set. EVSE 900 connected to inlet 71 may be a non-public power feed facility (for example, a power feed facility provided in one's house or workplace).

When the second charger use condition is satisfied (YES in S16), the process proceeds to S17. In S17, ECU 50 sets charger-discharger 62 to the limiting resistor ON state. Specifically, ECU 50 sets switch 533 (FIG. 2) to the open state. The electrical resistance of the second charging path is thus increased by limiting resistor 531.

In following S18, ECU 50 has the second charging path connected. Specifically, ECU 50 controls switching device 400 (the pair of C contact relays) to connect the input circuit to the battery circuit and to disconnect the output circuit from the battery circuit in charger-discharger 62. Vehicle 100 is thus in a state that both of the first charging path and the second charging path are connected.

Figure 6:
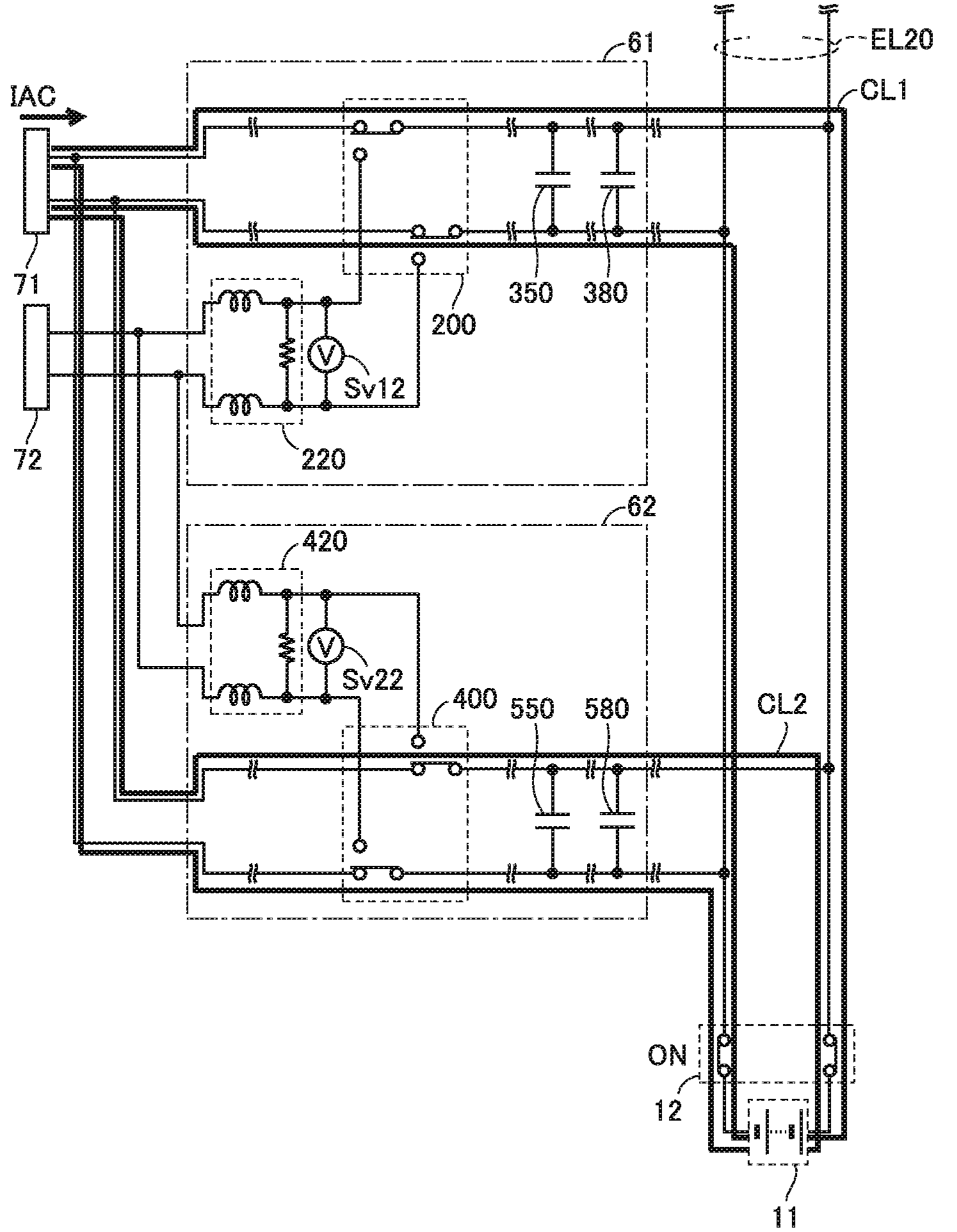
FIG. 6 is a diagram showing a state in which both of the first charging path and the second charging path are connected in the vehicle shown in FIG. 1.

FIG. 6 is a diagram showing a state in which both of the first charging path and the second charging path are connected in vehicle 100. Referring to FIG. 6, in charger-discharger 61, switching device 200 (more particularly, the C contact relays) connects first charging path CL1. In charger-discharger 62, switching device 400 (more particularly, the C contact relays) connects second charging path CL2. In the state shown in FIG. 6, both of the first power feed path and the second power feed path are disconnected and both of first charging path CL1 and second charging path CL2 are connected.

Referring again to FIG. 4 together with FIGS. 1 to 3, in S18, ECU 50 has second charging path CL2 (FIG. 6) connected and thereafter starts precharging of charger-discharger 62 (second charger). Specifically, ECU 50 requests EVSE 900 (control device 912) to feed electric power (for example, fed power from 5 kW to 10 kW) corresponding to both of charger-dischargers 61 and 62. In succession, in S19, while ECU 50 performs precharging of charger-discharger 62 with both of first charging path CL1 and second charging path CL2 being connected, ECU 50 determines whether or not precharging has been completed. Specifically, electricity is stored in smoothing capacitor 550 by precharging of charger-discharger 62. ECU 50 determines whether or not precharging of charger-discharger 62 has been completed based on whether or not a prescribed second precharging completion condition is satisfied. The second precharging completion condition may be a condition in accordance with the first precharging completion condition described previously. In this embodiment, the second precharging completion condition is satisfied when both of a second current requirement and a second voltage requirement are satisfied during precharging of charger-discharger 62. The second current requirement is satisfied when a current value IAC_B (a current that flows through charger-discharger 62) detected by current sensor $I_B$ is smaller than a prescribed third reference value (Th3). The second voltage requirement is satisfied when a voltage value VH_B (a voltage of smoothing capacitor 550) detected by voltage sensor Sv24 is larger than a prescribed fourth reference value (Th4). When one requirement of them is not satisfied, the second precharging completion condition is not satisfied. According to such a second precharging completion condition, whether or not precharging has been completed is more readily properly determined. Any second precharging completion condition can be set without being limited as above.

While the second precharging completion condition is not satisfied (NO in S19), ECU 50 allows precharging of charger-discharger 62 to continue, and when the second precharging completion condition is satisfied (YES in S19), the process proceeds to S20. In S20, ECU 50 sets charger-discharger 62 to the limiting resistor OFF state. Specifically, ECU 50 sets switch 533 (FIG. 2) to the closed state. Thus, the electrical resistance of second charging path CL2 becomes low and sufficient electric power tends to be supplied to battery 11.

After the processing in S20, in S21, ECU 50 determines that precharging has been completed, and makes transition to charging control following completion of precharging. When the second charger use condition is not satisfied (NO in S16), in S21, ECU 50 makes transition to charging control following completion of precharging, with processing in S17 to S20 being skipped. As transition to charging control following completion of precharging is made as a result of processing in S21, the series of processing shown in FIG. 4 ends.

In charging control following completion of precharging when the second charger use condition is satisfied, while both of first charging path CL1 and second charging path CL2 are connected, electric power is supplied from inlet 71 of vehicle 100 via charger-dischargers 61 and 62 to battery 11. Specifically, total charging power (IAC) which is combination of electric power (first charging power) that flows through first charging path CL1 and electric power (second charging power) that flows through second charging path CL2 is supplied to battery 11. For example, external charging of battery 11 is continued until a prescribed quitting condition is satisfied. Then, when the quitting condition is satisfied, external charging is stopped. For example, the quitting condition may be satisfied when battery 11 is fully charged. During charging, ECU 50 controls charger-dischargers 61 and 62. ECU 50 may control a notification apparatus (for example, HMI 81 or NAVI 82) to notify the user that charging at high power is being performed during charging using charger-dischargers 61 and 62.

In charging control following completion of precharging when the second charger use condition is not satisfied, while first charging path CL1 is connected and second charging path CL2 is disconnected, electric power is supplied from inlet 71 of vehicle 100 via charger-discharger 61 to battery 11. Specifically, electric power (first charging power) that flows through first charging path CL1 is supplied to battery 11 as total charging power (IAC). External charging of battery 11 is continued until the prescribed quitting condition is satisfied. During charging, ECU 50 controls charger-discharger 61. ECU 50 may control the notification apparatus (for example, HMI 81 or NAVI 82) to notify the user that charging at low power is being performed during charging using only charger-discharger 61.

When a prescribed power feed condition is satisfied while battery 11 is not being charged, ECU 50 controls switching devices 200 and 400 to connect both of the first power feed path and the second power feed path. The power feed condition may be satisfied when ECU 50 receives a power feed instruction from HMI 81. Charger-discharger 61 feeds power to outlet 72 with electric power from battery 11 while the first power feed path is connected. Charger-discharger 62 feeds power to outlet 72 with electric power from battery 11 while the second power feed path is connected. ECU 50 may control the notification apparatus (for example, HMI 81 or NAVI 82) to notify the user of completion of preparation for power feed at the time when both of the first power feed path and the second power feed path are connected. The user can have AC power outputted from outlet 72 supplied to a not-shown electric load (for example, an electrical appliance such as a light fixture or kitchen equipment) by opening trunk lid 73 (FIG. 1) and inserting a plug of a power supply cord of the electric load into outlet 72 (receptacle).

Figure 7:
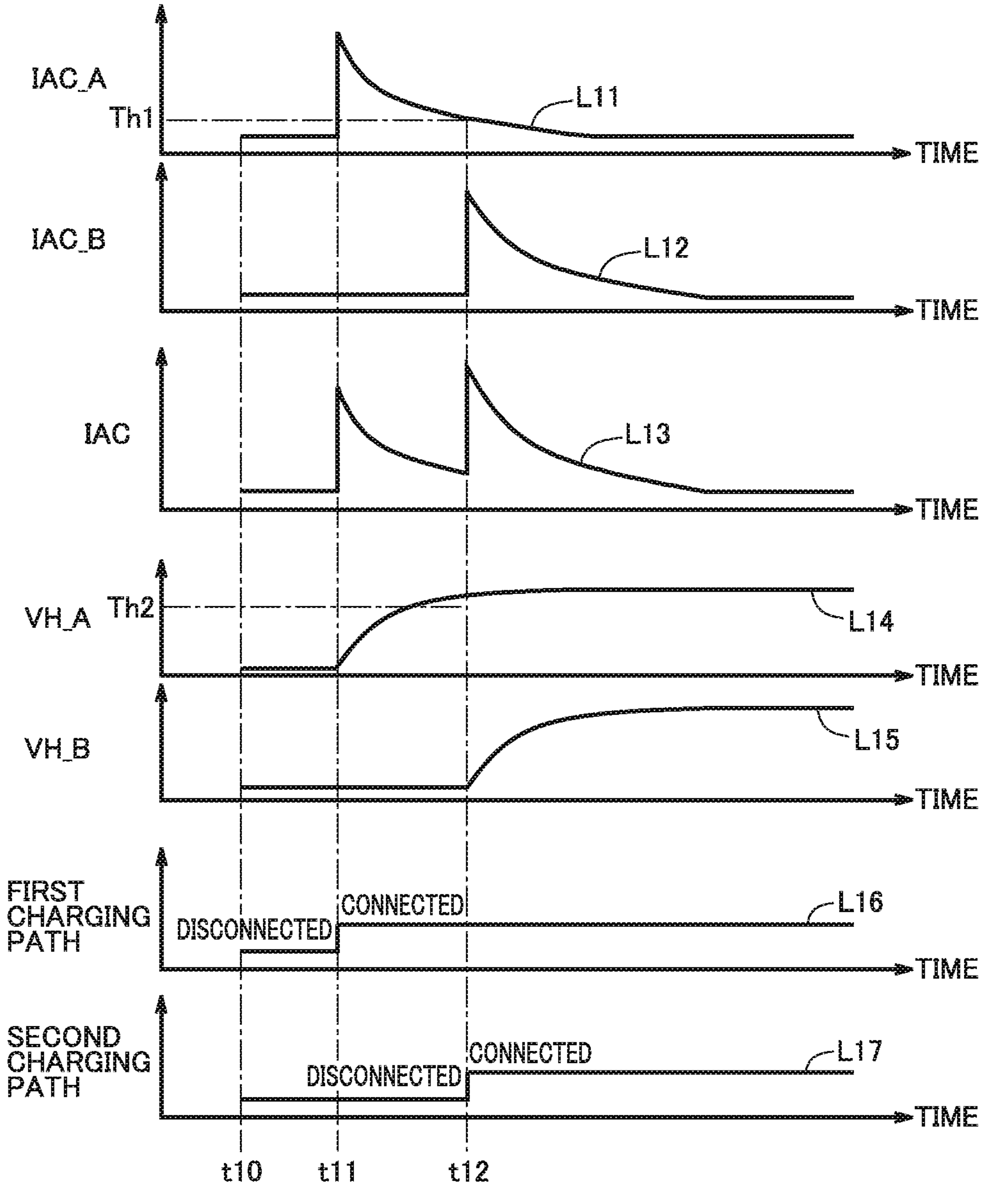
FIG. 7 is a time chart showing state transition of the first and second charger-dischargers when a second charger use condition is satisfied in precharging control shown in FIG. 4.

FIG. 7 is a time chart showing state transition of charger-dischargers 61 and 62 when the second charger use condition is satisfied in precharging control (FIG. 4) described previously. In FIG. 7, lines L11, L12, L13, L14, L15, L16, and L17 represent current value IAC_A (the current that flows through charger-discharger 61), current value IAC_B (the current that flows through charger-discharger 62), current value IAC (total charging power that flows through charger-dischargers 61 and 62), voltage value VH_A (the voltage of smoothing capacitor 350), voltage value VH_B (the voltage of smoothing capacitor 550), a state (connection/disconnection) of first charging path CL1, and a state (connection/disconnection) of second charging path CL2, respectively. "t" in the time chart means timing.

Referring to FIG. 7, when precharging control shown in FIG. 4 is started at t10, both of first charging path CL1 and second charging path CL2 are disconnected (lines L16 and L17). Thereafter, at t11, first charging path CL1 (line L16) is connected and precharging of charger-discharger 61 is started (S13 in FIG. 4). Thus, the current (line L11) that flows through charger-discharger 61, the voltage (line L14) of smoothing capacitor 350, and total charging power (line L13) increase. With increase in voltage of smoothing capacitor 350, the rush current that flows into charger-discharger 61 becomes lower. Thereafter, when precharging of charger-discharger 61 is completed at t12, second charging path CL2 (line L17) is connected and precharging of charger-discharger 62 is started (S18 in FIG. 4). Thus, the current (line L12) that flows through charger-discharger 62, the voltage (line L15) of smoothing capacitor 550, and total charging power (line L13) increase. With increase in voltage of smoothing capacitor 550, the rush current that flows into charger-discharger 62 becomes lower. ECU 50 controls switching device 400 to disconnect second charging path CL2 before charging of battery 11, completes precharging of charger-discharger 61 while second charging path CL2 is disconnected and first charging path CL1 is connected (see FIG. 5), and thereafter controls switching device 400 to connect second charging path CL2 (see FIG. 6).

As described above, the charging method according to this embodiment includes the series of processing shown in FIG. 4. In S11 to S13, ECU 50 has first charging path CL1 connected and has second charging path CL2 disconnected. In S13 to S14, while second charging path CL2 is disconnected and first charging path CL1 is connected, ECU 50 performs precharging of charger-discharger 61. In S14, ECU 50 determines whether or not precharging of charger-discharger 61 has been completed. When ECU 50 determines that precharging of charger-discharger 61 has been completed, in S18, ECU 50 has both of first charging path CL1 and second charging path CL2 connected.

In the method above, charger-dischargers 61 and 62 (the plurality of chargers) are precharged one by one. Specifically, while second charging path CL2 is disconnected and first charging path CL1 is connected, ECU 50 completes precharging of charger-discharger 61 and thereafter has second charging path CL2 connected. According to such control, even when charging power (total charging power of charger-dischargers 61 and 62) supplied from inlet 71 of vehicle 100 via the chargers (charger-dischargers 61 and 62) to battery 11 is high, sufficient suppression of the rush current at the time of precharging is facilitated.

The configuration of the vehicle is not limited to the configuration (FIGS. 1 to 3) described previously. Though FIG. 1 shows a four-wheel car of front-wheel drive, the number of wheels and the type of drive can be modified as appropriate. The drive type may be rear-wheel drive or four-wheel drive. Three wheels or five or more wheels may be provided. The vehicle is not limited to a passenger car but a bus or a truck may be applicable. The vehicle is not limited to the PHEV, and a BEV not including an internal combustion engine or another xEV may be applicable.

Any number of control devices (processors) may be provided in the vehicle. For example, a controller that controls charger-dischargers 61 and 62 in accordance with an instruction from ECU 50 may be provided between charger-dischargers 61 and 62 and ECU 50 (or in charger-dischargers 61 and 62). A sensor (for example, a temperature sensor that detects high-temperature abnormality) that detects an abnormal condition of PFC circuits 340 and 540 may be provided. External power feed of the vehicle is not essential. The vehicle may include a charger (charging circuit) instead of the charger-discharger. The number of chargers provided in the vehicle is not limited to two. Three or more chargers may be connected in parallel.

The vehicle may include a solar panel. The vehicle may be configured as being wirelessly chargeable. The vehicle adapted to wireless charging (contactless charging) may be regarded as being in a state comparable to the "plugged-in state" described previously when alignment between a power transmission unit (for example, a power transmission coil) on a side of the power feed facility and a power reception unit (for example, a power reception coil) on a side of the vehicle is completed. In such a vehicle, the power reception unit corresponds to the charging port. The vehicle may be configured to be capable of autonomous driving or may perform a flying function. The vehicle may be a vehicle capable of traveling without human intervention (for example, an automated guided vehicle or agricultural machinery).

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle comprising:
a charging port to which electric power from outside of the vehicle is inputted;
a power storage;
a charger; and
a control device that controls the charger, wherein
the charger includes a first charger and a second charger,
the first charger is configured to charge the power storage with the electric power from the charging port while a first charging path is connected, the first charging path leading from the charging port via the first charger to the power storage,
the second charger is configured to charge the power storage with the electric power from the charging port while a second charging path is connected, the second charging path leading from the charging port via the second charger to the power storage,
the second charging path is provided with a switching device that switches between connection and disconnection of the second charging path, and
the control device controls the switching device to
disconnect the second charging path before charging of the power storage,
maintain the first and second charging paths in a state where the second charging path is disconnected and the first charging path is connected during precharging of the first charger, and
connect the second charging path after the precharging of the first charger is completed, the vehicle further comprising a power feed port for output of the electric power to the outside of the vehicle, wherein
the second charger is configured to feed the electric power to the power feed port with the electric power from the power storage while a power feed path is connected, the power feed path leading from the power storage via the second charger to the power feed port, and
the switching device includes a contact relay that connects any one of the second charging path and the power feed path and disconnects the other of the second charging path and the power feed path.

2. The vehicle according to claim 1, wherein
the first charger includes a capacitor where electricity is stored by the precharging, and
the control device determines that the precharging of the first charger has been completed when a current that flows through the first charger becomes lower than a first reference value and a voltage of the capacitor becomes higher than a second reference value during the precharging of the first charger.

3. The vehicle according to claim 1, wherein
the control device is configured to control the switching device to
connect the second charging path upon completion of the precharging of the first charger when a prescribed condition is satisfied, and
disconnect the second charging path in spite of completion of the precharging of the first charger when the prescribed condition is not satisfied, and the prescribed condition includes a condition that a rated output power of a power feed facility outside the vehicle exceeds a prescribed value, the power feed facility being connected to the charging port.

4. A vehicle comprising:

a charging port to which electric power from outside of the vehicle is inputted;

a power storage;

a charger; and a control device that controls the charger, wherein the charger includes a first charger and a second charger, the first charger is configured to charge the power storage with the electric power from the charging port while a first charging path is connected, the first charging path leading from the charging port via the first charger to the power storage, the second charger is configured to charge the power storage with the electric power from the charging port while a second charging path is connected, the second charging path leading from the charging port via the second charger to the power storage, the second charging path is provided with a switching device that switches between connection and disconnection of the second charging path, and the control device controls the switching device to disconnect the second charging path before charging of the power storage, maintain the first and second charging paths in a state where the second charging path is disconnected and the first charging path is connected during precharging of the first charger, and connect the second charging path after the precharging of the first charger is completed, the vehicle further comprising a power feed port for output of the electric power to the outside of the vehicle, wherein the first charger is configured to feed the electric power to the power feed port with the electric power from the power storage while a first power feed path is connected, the first power feed path leading from the power storage via the first charger to the power feed port, the first charging path is provided with a first contact relay that connects any one of the first charging path and the first power feed path and disconnects the other of the first charging path and the first power feed path, the second charger is configured to feed the electric power to the power feed port with the electric power from the power storage while a second power feed path is connected, the second power feed path leading from the power storage via the second charger to the power feed port, and the switching device includes a second contact relay that connects any one of the second charging path and the second power feed path and disconnects the other of the second charging path and the second power feed path.

5. The vehicle according to claim 4, wherein the control device is configured to control the switching device to connect the second charging path upon completion of the precharging of the first charger when a prescribed condition is satisfied, and disconnect the second charging path in spite of completion of the precharging of the first charger when the prescribed condition is not satisfied, and the prescribed condition includes a condition that the second charger is available.

6. A charging method of charging a power storage mounted on a vehicle with electric power inputted to a charging port of the vehicle, the vehicle comprising a power feed port for output of the electric power to outside of the vehicle, the charging method comprising:

connecting a first charging path leading from the charging port via a first charger to the power storage;

disconnecting a second charging path leading from the charging port via a second charger to the power storage;

performing precharging of the first charger while the second charging path is disconnected and the first charging path is connected;

determining whether the precharging of the first charger has been completed;

connecting both of the first charging path and the second charging path when it is determined that the precharging of the first charger has been completed; and feeding, via the second charger, the electric power to the power feed port with the electric power from the power storage while a power feed path is connected, the power feed path leading from the power storage via the second charger to the power feed port, wherein a switching device includes a contact relay that connects any one of the second charging path and the power feed path and disconnects the other of the second charging path and the power feed path.

7. A computer apparatus comprising:

a processor; and a storage where a program that causes the processor to perform the charging method according to claim 6 is stored.

* * * * *